(12) United States Patent
Li et al.

(10) Patent No.: US 12,253,749 B2
(45) Date of Patent: Mar. 18, 2025

(54) DISPLAY APPARATUS AND REARVIEW MIRROR

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Wenbo Li, Beijing (CN); Huaiping Zhang, Beijing (CN); Xiaodong Huang, Beijing (CN); Yuqiang Zhao, Beijing (CN); Jindou Liu, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/043,524

(22) PCT Filed: Jan. 4, 2022

(86) PCT No.: PCT/CN2022/070090
§ 371 (c)(1),
(2) Date: Feb. 28, 2023

(87) PCT Pub. No.: WO2023/130209
PCT Pub. Date: Jul. 13, 2023

(65) Prior Publication Data
US 2024/0288721 A1   Aug. 29, 2024

(51) Int. Cl.
*G02F 1/133* (2006.01)
*G02F 1/1335* (2006.01)
(Continued)

(52) U.S. Cl.
CPC .... *G02F 1/13312* (2021.01); *G02F 1/133536* (2013.01); *G02F 1/13439* (2013.01); *G02F 1/13452* (2013.01)

(58) Field of Classification Search
CPC .. B60R 1/04; B60R 1/08; B60R 1/083; B60R 1/088; B60R 2001/1253; B60R 2001/1215; G02F 1/13452
See application file for complete search history.

(56) References Cited

U.S. PATENT DOCUMENTS

| | | | |
|---|---|---|---|
| 5,285,060 A | 2/1994 | Larson et al. | |
| 2005/0270620 A1* | 12/2005 | Bauer | H05K 1/0274 359/265 |

(Continued)

FOREIGN PATENT DOCUMENTS

| | | |
|---|---|---|
| CN | 1818745 A | 8/2006 |
| CN | 207433392 U | 6/2018 |

(Continued)

OTHER PUBLICATIONS

Kwon et al. (KR 20090070328) (Year: 2009).*
(Continued)

*Primary Examiner* — Alexander P Gross
(74) *Attorney, Agent, or Firm* — Dority & Manning, P.A.

(57) ABSTRACT

A display apparatus includes a display panel, a mirror switching screen, a first photosensitive sensor, a first flexible circuit board and a driver board. The mirror switching screen is disposed on a light-exit side of the display panel. The first photosensitive sensor is configured to sense a light intensity of ambient light at a side of the mirror switching screen away from the display panel. The first flexible circuit board includes a bonding portion, a component portion and a wiring portion. The bonding portion is electrically connected to the mirror switching screen. The first photosensitive sensor is disposed on a side of the component portion proximate to the mirror switching portion.
The wiring portion has lines electrically connected to the first photosensitive sensor and bonding pads of the bonding (Continued)

portion. The driver board is electrically connected to the wiring portion of the first flexible circuit board.

20 Claims, 7 Drawing Sheets

(51) Int. Cl.
  *G02F 1/1343* (2006.01)
  *G02F 1/1345* (2006.01)

(56) References Cited

U.S. PATENT DOCUMENTS

| | | | |
|---|---|---|---|
| 2010/0039760 | A1 | 2/2010 | Yang et al. |
| 2014/0022390 | A1* | 1/2014 | Blank ................ B60R 1/02 348/148 |
| 2015/0036085 | A1 | 2/2015 | Chen et al. |
| 2015/0277203 | A1 | 10/2015 | VanderPloeg et al. |
| 2017/0140699 | A1 | 5/2017 | Okohira |
| 2018/0321546 | A1 | 11/2018 | Sakai et al. |
| 2019/0263322 | A1 | 8/2019 | Hayashi et al. |
| 2020/0384924 | A1 | 12/2020 | Broghammer et al. |
| 2021/0215961 | A1 | 7/2021 | Gohara et al. |

FOREIGN PATENT DOCUMENTS

| | | | |
|---|---|---|---|
| CN | 108462767 | A | 8/2018 |
| CN | 108556743 | A | 9/2018 |
| CN | 207826103 | U | 9/2018 |
| CN | 209683556 | U | 11/2019 |
| CN | 110596934 | A | 12/2019 |
| CN | 210062828 | U | 2/2020 |
| CN | 111812876 | A | 10/2020 |
| CN | 212890112 | U | 4/2021 |
| CN | 112874440 | A | 6/2021 |
| CN | 112927627 | A | 6/2021 |
| CN | 214523571 | U | 10/2021 |
| DE | 202014007830 | U1 | 11/2014 |
| JP | 2006185610 | A | 7/2006 |
| KR | 2009070328 | A * | 7/2009 ......... G02F 1/13452 |
| WO | WO 2021000824 | A1 | 1/2021 |

OTHER PUBLICATIONS

International Search Report and Written Opinion (with English translation) for PCT Application No. PCT/CN2022/077717, dated Jul. 25, 2022, 18 pages.

International Search Report (with English translation) and Written Opinion for PCT Application No. PCT/CN2022/070090, dated Aug. 17, 2022, 13 pages.

* cited by examiner

DISPLAY APPARATUS AND REARVIEW MIRROR

CROSS-REFERENCE TO RELATED APPLICATION

This application is a national phase entry under 35 USC 371 of International Patent Application No. PCT/CN2022/070090 filed on Jan. 4, 2022, which is incorporated herein by reference in its entirety.

TECHNICAL FIELD

The present disclosure relates to the field of display technologies, and in particular, to a display apparatus and a rearview mirror.

BACKGROUND

With the development of display technologies, display apparatuses have been widely used in various fields. A streaming media rearview mirror, which is formed by applying a display apparatus to a rearview mirror of an automobile, may present an image reflecting a situation at rear of the vehicle. Compared to a conventional rearview mirror with a mirror surface, the streaming media rearview mirror has advantages such as broad view and anti-glare. Therefore, streaming media rearview mirrors are becoming increasingly popular.

SUMMARY

In an aspect, a display apparatus is provided. The display apparatus includes a display panel, a mirror switching screen, a first photosensitive sensor, a first flexible circuit board and a driver board. The mirror switching screen is disposed on a light-exit side of the display panel. The first photosensitive sensor is configured to sense a light intensity of ambient light at a side of the mirror switching screen away from the display panel. The first flexible circuit board includes a bonding portion, a component portion and a wiring portion. The bonding portion is electrically connected to the mirror switching screen. The first photosensitive sensor is disposed on a side of the component portion proximate to the mirror switching portion. The wiring portion has lines electrically connected to the first photosensitive sensor and bonding pads of the bonding portion. The driver board is electrically connected to the wiring portion of the first flexible circuit board.

In some embodiments, the bonding portion and the component portion are both located at an end of the wiring portion proximate to the mirror switching screen, and the bonding portion and the component portion have a gap therebetween.

In some embodiments, a minimum distance between an edge of the bonding portion proximate to the component portion and an edge of the component portion proximate to the bonding portion is in a range of 25.55 mm to 25.95 mm, inclusive.

In some embodiments, the driver board is further electrically connected to the display panel.

In some embodiments, the display apparatus further includes a second flexible circuit board. The second flexible circuit board is electrically connected to the display panel and the driver board. The driver board is capable of being disposed on a side of the display panel away from the mirror switching screen through bending of the first flexible circuit board and the second flexible circuit board.

In some embodiments, in a direction from the display panel to the mirror switching screen, the mirror switching screen includes a reflective polarizer, a first transparent substrate, a first transparent electrode layer, a first alignment film, a liquid crystal layer, a second alignment film, a second transparent electrode layer, a second transparent substrate and a first absorptive polarizer that are disposed in sequence. A transmission axis of the reflective polarizer is substantially perpendicular to an absorption axis of the first absorptive polarizer. An orientation direction of the first alignment film is substantially parallel to the transmission axis of the reflective polarizer. An orientation direction of the second alignment film is substantially parallel to the absorption axis of the first absorptive polarizer.

In some embodiments, an orthographic projection of the first transparent substrate on a reference surface is located within an orthographic projection of the second transparent substrate on the reference surface. The reference surface is a plane where a surface of the mirror switching screen away from the display panel is located. An edge portion, beyond the first transparent substrate, of the second transparent substrate forms a first step. A side of the first step away from the display panel has bonding pins. The bonding pads are further electrically connected to the bonding pins.

In some embodiments, the first photosensitive sensor includes a base and a photosensitive chip. A first surface of the base has a mounting groove. The photosensitive chip is disposed in the mounting groove. A second surface of the base has a light-transmitting hole. The photosensitive chip is configured to sense the light intensity of the ambient light at the side of the mirror switching screen away from the display panel through the light-transmitting hole. The first surface and the second surface are two opposite surfaces of the base. The first surface of the base is connected to the first flexible circuit board, and the second surface of the base is bonded to the side of the first step proximate to the display panel.

In some embodiments, a center of an orthographic projection of the first photosensitive sensor on the reference surface is substantially coincident with a center of an orthographic projection of the first step on the reference surface.

In some embodiments, the mirror switching screen has a display region and a peripheral region located on at least one side of the display region. The display apparatus further includes a light-shielding layer. The light-shielding layer is disposed on a side of the second transparent substrate away from the display panel and covers the peripheral region.

In some embodiments, the light-shielding layer is disposed between the second transparent substrate and the first absorptive polarizer. The first absorptive polarizer covers at least a portion of the light-shielding layer.

In some embodiments, the light-shielding layer and the first absorptive polarizer are both disposed on a surface of the second transparent substrate away from the display panel. An edge of an orthographic projection of the light-shielding layer on a reference surface and an edge of an orthographic projection of the first absorptive polarizer on the reference surface that are adjacent to each other are substantially coincident with each other, or have a gap therebetween. The reference surface is a plane where a surface of the mirror switching screen away from the display panel is located.

In some embodiments, the light-shielding layer has an avoidance hole. An orthographic projection of the first photosensitive sensor on a reference surface at least partially overlaps with an orthogonal projection of the avoidance hole on the reference surface. The reference surface is a plane where a surface of the mirror switching screen away from the display panel is located.

In some embodiments, the display apparatus further includes a second absorptive polarizer. The second absorptive polarizer is disposed between the display panel and the mirror switching screen. An absorption axis of the second absorptive polarizer is substantially perpendicular to the transmission axis of the reflective polarizer.

In some embodiments, an edge portion, beyond the first transparent substrate, of the second transparent substrate forms a first step. An orthographic projection of the second absorptive polarizer on a reference surface is located within an orthographic projection of the display panel on the reference surface, and the reference surface is a plane where a surface of the mirror switching screen away from the display panel is located. An edge portion, beyond the second absorptive polarizer, of the display panel forms a second step. An orthographic projection of the first step on the reference surface at least partially overlaps with an orthographic projection of the second step on the reference surface. The display apparatus further includes a support. An end of the support abuts at least the first flexible circuit board, and another end of the support abuts the second step.

In some embodiments, at a side of the support away from the second absorptive polarizer, the first flexible circuit board extends to a backlight side of the display panel.

In some embodiments, the display apparatus further includes a second photosensitive sensor. The second photosensitive sensor is disposed on a side of the display panel away from the mirror switching screen and configured to sense a light intensity of ambient light on a backlight side of the display panel. The driver board is further electrically connected to the second photosensitive sensor.

In another aspect, another display apparatus is provided. The display apparatus includes a mirror switching display panel, a first photosensitive sensor, a first circuit board and a driver board. The first photosensitive sensor is configured to sense a light intensity of ambient light on a light-exit side of the mirror switching display panel. The first circuit board includes a bonding portion, a component portion and a wiring portion. The first photosensitive sensor is disposed with the component portion. The trace portion has lines electrically connected to the first photosensitive sensor and bonding pads of the bonding portion. The driver board is electrically connected to a wiring portion of the first circuit board and further electrically connected to the mirror switching display panel.

In yet another aspect, a rearview mirror is provided. The rearview mirror includes the display apparatus according to any one of the above embodiments.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person having ordinary skill in the art can obtain other drawings according to these accompanying drawings. In addition, the accompanying drawings in the following description may be regarded as schematic diagrams, but are not limitations on an actual size of a product, an actual process of a method and an actual timing of a signal involved in the embodiments of the present disclosure.

DETAILED DESCRIPTION

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representation of the above terms does not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, the features defined with "first" and "second" may explicitly or implicitly include one or more of the features. In the description of the embodiments of the present disclosure, the term "a plurality of/the plurality of" means two or more unless otherwise specified.

Some embodiments may be described using the terms "coupled" and "connected" and their derivatives. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has a same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The phrase "applicable to" or "configured to" as used herein indicates an open and inclusive expression, which does not exclude devices that are applicable to or configured to perform additional tasks or steps.

Exemplary embodiments are described herein with reference to sectional views and/or plan views as idealized exemplary drawings. In the accompanying drawings, thicknesses of layers and areas of regions are enlarged for clarity. Thus, variations in shape with respect to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing.

In addition, the use of the phrase "based on" is meant to be open and inclusive, since a process, step, calculation or other action that is "based on" one or more of the stated conditions or values may, in practice, be based on additional conditions or values exceeding those stated.

Terms such as "about", "substantially" or "approximately" as used herein include a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

As used herein, the terms such as "parallel", "perpendicular" or "equal" include a stated case and a case similar to the stated case. The similar case is within an acceptable range of deviation, and the acceptable range of deviation is determined by a person of ordinary skill in the art in view of measurement in question and errors associated with measurement of a particular quantity (i.e., limitations of a measurement system). For example, the term "parallel" includes absolute parallelism and approximate parallelism, and an acceptable range of deviation of the approximate parallelism may be a deviation within 5°; and the term "perpendicular" includes absolute perpendicularity and approximate perpendicularity, and an acceptable range of deviation of the approximate perpendicularity may be a deviation within 5°. The term "equal" includes absolute equality and approximate equality, and an acceptable range of deviation of the approximate equality may refer to that, a difference between two equals is less than or equal to 5% of either of the two equals.

Figure 1:
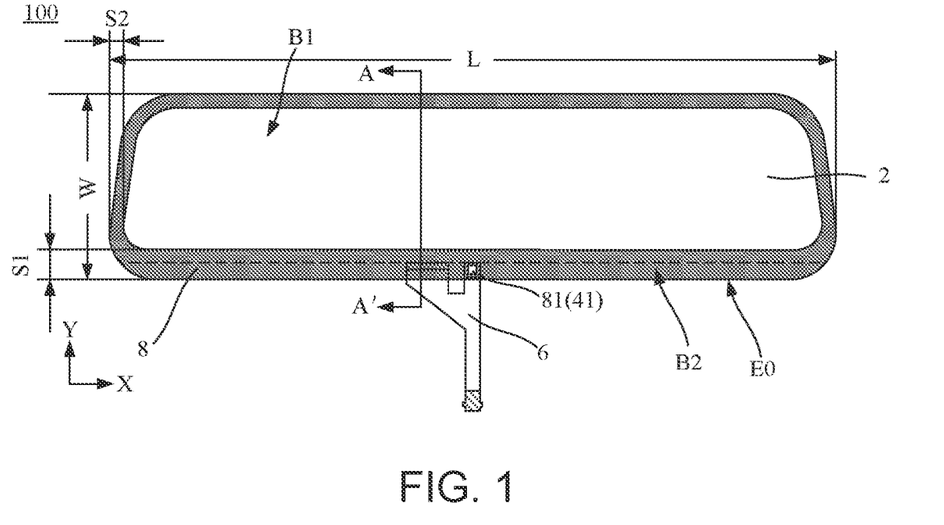
FIG. 1 is a structural diagram of a display apparatus, in accordance with some embodiments.

As shown in FIG. 1, some embodiments of the present disclosure provide a display apparatus 100. The display apparatus 100 may be a television, a mobile phone, a computer, a notebook computer, a tablet computer, a personal digital assistant (PDA), an on-board computer, a rearview mirror, or the like.

The display apparatus 100 may be a liquid crystal display (LCD) device, an electroluminescent display apparatus or a photoluminescent display apparatus. In a case where the display apparatus 100 is an electroluminescent display apparatus, the electroluminescent display apparatus may be an organic electroluminescent display apparatus (e.g., organic light-emitting diode (OLED) display apparatus) or a quantum dot electroluminescent display apparatus (e.g., quantum dot light-emitting diode (QLED) display apparatus). In a case where the display apparatus 100 is a photoluminescent display apparatus, the photoluminescence display apparatus may be a quantum dot photoluminescent display apparatus.

Figure 2:
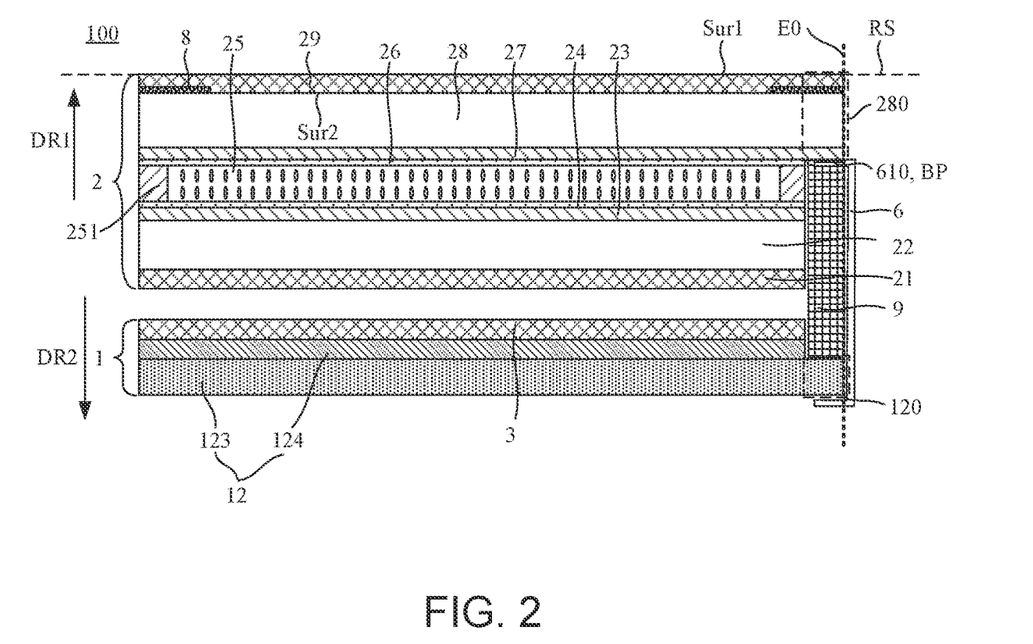
FIG. 2 is a section taken along the section line A-A' in FIG. 1.

As shown in FIG. 2, the display apparatus 100 includes a display module 1 and a mirror switching screen 2 located on a light-exit side of the display module 1. The mirror switching screen 2 is configured to be switchable between a high transmission state and a high reflection state. When the mirror switching screen 2 is in the high transmission state, images displayed on the display module 1 can be transmitted to an outside through the mirror switching screen 2, so that a display function of the display apparatus is achieved; and when the mirror switching screen 2 is in the high reflection state, ambient light is reflected by the mirror switching screen 2, which renders mirror images.

It will be noted that, in order to avoid ghosts cause by an interference between the mirror images presented by the mirror switching screen 2 and the images displayed on the display module 1, when the display module 1 displays an image, the mirror switching screen 2 is kept in the high transmission state, and a transmittance thereof is greater than or equal to 90%; and when the display module 1 does not display an image, the mirror switching screen 2 is kept in the high reflection state, and a reflectance thereof is greater than or equal to 40%.

In some embodiments, as shown in FIG. 2, in a direction DR1 from the mirror switching screen 2 to the display module 1, the display module 1 includes a second absorptive polarizer 3 and a display panel 12 that are disposed in sequence, and other electronic accessories. In a case where the display apparatus 100 is a LCD apparatus, the display apparatus 100 further includes a backlight module. The backlight module is configured to provide the display panel 12 with light for displaying images.

An orthographic projection of the display panel 12 on a reference surface RS is located within an orthographic projection of the mirror switching screen 2 on the reference surface. It will be noted that, the reference plane RS is a plane where a surface Sur1 of the mirror switching screen 2 away from the display panel 12 is located.

Figure 5:
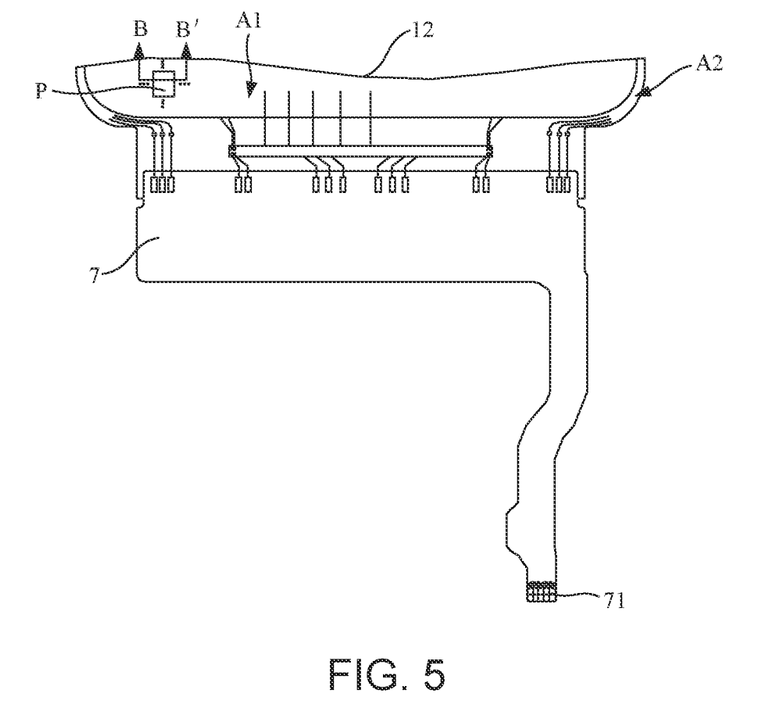
FIG. 5 is a structural diagram of a display apparatus in which a display panel and a second flexible circuit board are connected, in accordance with some embodiments.

In some embodiments, as shown in FIG. 5, the display panel 12 includes a display region A1 and a peripheral region A2 located on at least one side of the display region A1.

Here, the display region A1 is a region for display images, and the display region A1 is configured to be provided therein with sub-pixels P. The peripheral region A2 is a region that does not display an image. The peripheral region A2 may be configured to be provided therein with various signal lines required for displaying images. The peripheral region A2 may also be configured to be provided therein with a gate driving circuit that outputs scanning signals to the sub-pixels P in the display region A1, and a source driving circuit that outputs data signals to the sub-pixels P in the display region A1.

Figure 6:
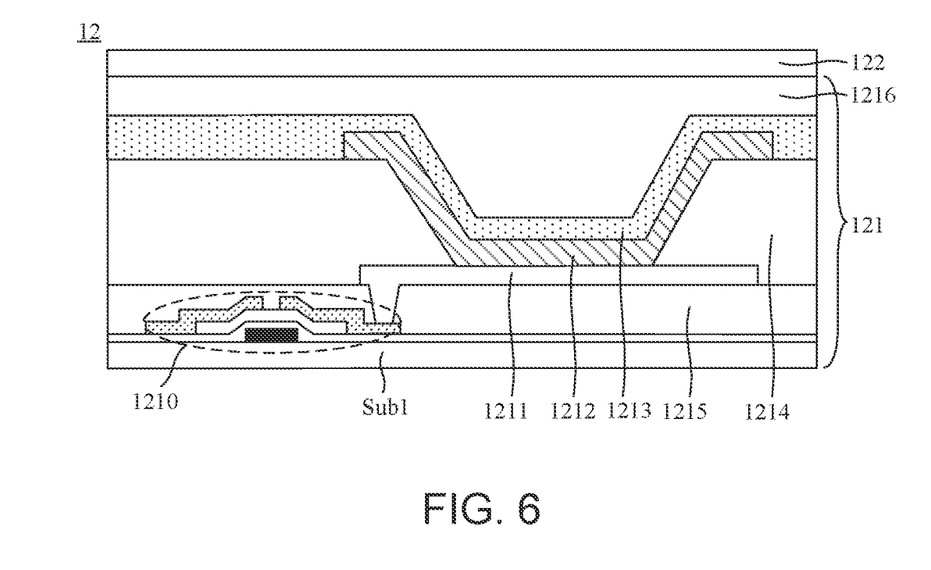
FIG. 6 is a section taken along the section line B-B' in FIG. 5, in accordance with some embodiments.

In some embodiments, the display panel 12 is an electroluminescent display panel. As shown in FIG. 6, the electroluminescent display panel includes a display substrate 121 and an encapsulation layer 122 for encapsulating the display substrate 121.

Here, the encapsulation layer 122 may be an encapsulation film or may be an encapsulation substrate.

As shown in FIG. 6, each sub-pixel of the display substrate 121 includes a light-emitting device and a pixel driving circuit that are disposed on a first substrate Sub1. The pixel driving circuit includes a plurality of thin film transistors 1210. The thin film transistor 1210 includes an active layer, a source, a drain, a gate and a gate insulating layer, where the source and the drain are both in contact with the active layer. The light-emitting device includes an anode 1211, a light-emitting function layer 1212 and a cathode 1213. The anode 1211 is electrically connected to a source or a drain of a thin film transistor 1210, which acts as a driving transistor, of the plurality of thin film transistors 1210. FIG. 6 illustrates an example where the anode 1211 is electrically connected to the drain of the thin film transistor 1210.

The display substrate 121 further includes a pixel defining layer 1214. The pixel defining layer 1214 includes a plurality of opening regions. A single light-emitting device is disposed in a respective opening region.

In some embodiments, the light-emitting function layer 1212 includes only a light-emitting layer. In some other embodiments, in addition to the light-emitting layer, the light-emitting function layer 1212 further includes at least one of an electron transport layer (ETL), an electron injection layer (EIL), a hole transport layer (HTL) and a hole injection layer (HIL).

In some embodiments, as shown in FIG. 6, the display substrate 121 further includes a planarization layer 1215 disposed between the thin film transistor 1210 and the anode 1211.

In some embodiments, as shown in FIG. 6, the display substrate 121 further includes a first protection layer 1216. The first protection layer 1216 is disposed on a side of the cathode 1213 facing away from the first substrate Sub1.

Figure 7:
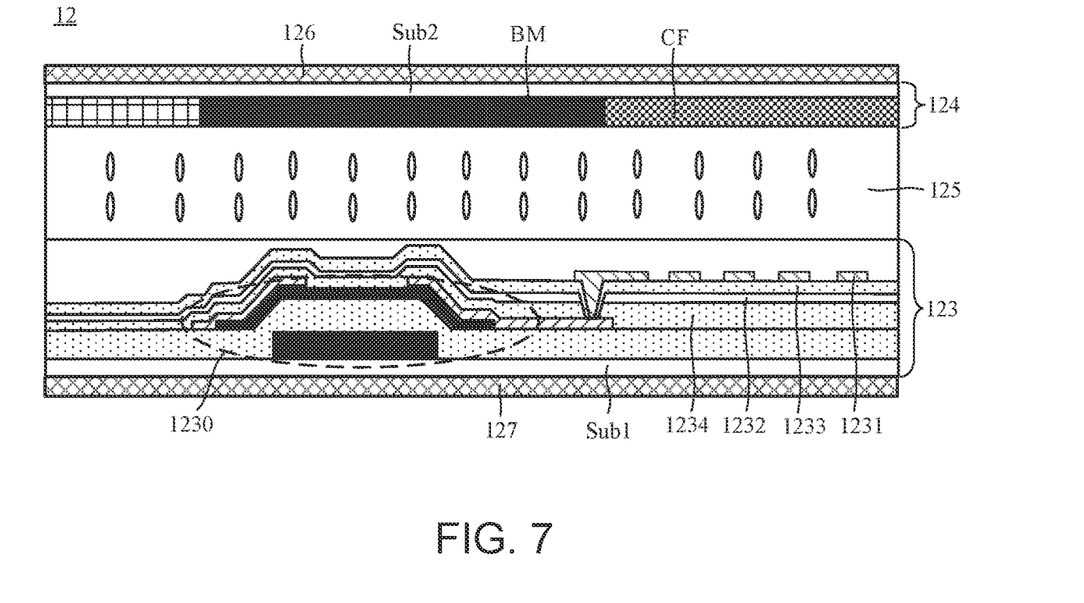
FIG. 7 is another section taken along the section line B-B' in FIG. 5, in accordance with some embodiments.

In some embodiments, the display panel 12 is a LCD panel. As shown in FIG. 7, the LCD panel includes an array substrate 123 and an opposite substrate 124 that are disposed opposite to each other, and a liquid crystal cell 125 disposed between the array substrate 123 and the opposite substrate 124.

Each sub-pixel P (referring to FIG. 5) of the array substrate 123 includes a thin film transistor 1230 and a pixel electrode 1231 that are located on a first substrate Sub1. The pixel electrode 1231 is electrically connected to a source or a drain of the thin film transistor 1230. FIG. 7 illustrates an example where the pixel electrode 1231 is electrically connected to the drain of the thin film transistor 1230.

In some embodiments, as shown in FIG. 7, the array substrate 123 further includes a common electrode 1232 disposed on the first substrate Sub1.

For example, the pixel electrode 1231 and the common electrode 1232 may be disposed in a same layer. In this case, the pixel electrode 1231 and the common electrode 1232 are each a comb structure including a plurality of strip-shaped sub-electrodes.

For example, the pixel electrode 1231 and the common electrode 1232 may also be disposed in different layers. In this case, as shown in FIG. 7, a first insulating layer 1233 is disposed between the pixel electrode 1231 and the common electrode 1232.

In addition, in a case where the common electrode 1232 is disposed between the thin film transistor 1230 and the pixel electrode 1231, as shown in FIG. 7, a second insulating layer 1234 is disposed between the common electrode 1232 and the thin film transistor 1230.

In some other embodiments, the opposite substrate 124 includes a second substrate Sub2 and the common electrode 1232. The common electrode 1232 is disposed on the second substrate Sub2.

As shown in FIG. 7, the LCD panel further includes a color filter layer CF and a black matrix pattern BM. The color filter layer CF includes at least red photoresist units each facing a red sub-pixel, green photoresist units each facing a green sub-pixel, and blue photoresist units each facing a blue sub-pixel. The black matrix pattern BM is configured to separate light emitted from different photoresist units, and play a role in preventing ambient light that enters the LCD panel from producing reflected light.

As shown in FIG. 7, the LCD panel further includes an upper polarizer 126 disposed on a side of the opposite substrate 124 away from the liquid crystal cell 125, and a lower polarizer 127 disposed on a side of the array substrate 123 away from the liquid crystal cell 125.

It will be noted that, the upper polarizer 126 (referring to FIG. 7) and the second absorptive polarizer 3 (referring to FIG. 2) may be a same polarizer. In addition, the liquid crystal cell 125 includes alignment films, a frame sealant and liquid crystal molecules. The alignment films are used for configuring an initial arrangement of the liquid crystal molecules. The frame sealant is used for preventing the liquid crystal molecules from leaking, and supporting and connecting the first substrate Sub1 and the second substrate Sub2. The embodiments of the present disclosure will not explain these in detail here.

In some embodiments, as shown in FIG. 2, in a direction DR2 from the display panel 12 to the mirror switching screen 2, the mirror switching screen 2 includes a reflective polarizer 21, a first transparent substrate 22, a first transparent electrode layer 23, a first alignment film 24, a liquid crystal layer 25, a second alignment film 26, a second transparent electrode layer 27, a second transparent substrate 28 and a first absorptive polarizer 29 that are disposed in sequence.

It will be noted that, the liquid crystal layer 25 includes a frame sealant 251 and liquid crystal molecules located in a space provided by the frame sealant 251, the first alignment film 24 and the second alignment film 26. The embodiments of the present disclosure will not be described this in detail here.

Here, in a process of forming the liquid crystal layer 25, the frame sealant 251, the first alignment film 24 and the second alignment film 26 need to be formed first, the frame sealant 251 being provided with a crystal filling opening; the liquid crystal molecules are poured into the space formed by the frame sealant 251, the first alignment film 24 and the second alignment film 26 through the crystal filling opening; and finally the crystal filling opening is sealed by hole sealing adhesive to prevent the liquid crystal molecules from flowing out. It will be noted that, the frame sealant 251 may be provided with a plurality of crystal filling openings, which improves production efficiency. For example, two crystal filling openings are provided in the frame sealant 251.

The reflective polarizer 21 includes any one of an advanced polarizing film (APF), a reflective polarizing mirror (RPM), a dual brightness enhancement film (DBEF) or a metal mesh reflective polarizing film.

For example, a transmission axis of the reflective polarizer 21 is substantially perpendicular to an absorption axis of the first absorptive polarizer 29, an orientation direction of the first alignment film 24 is substantially parallel to the transmission axis of the reflective polarizer 21, and an orientation direction of the second alignment film 26 is substantially parallel to the absorption axis of the first absorptive polarizer 29. That is to say, long axis directions of liquid crystal molecules in the liquid crystal layer 25 approximate to the first alignment film 24 are substantially parallel to the transmission axis of the reflective polarizer 21, and long axis directions of liquid crystal molecules in the liquid crystal layer 25 approximate to the second alignment film 26 are substantially parallel to the absorption axis of the first absorptive polarizer 29. The liquid crystal molecules are arranged in layers, arrangement directions of liquid crystal molecules in each layer are the same, arrangement directions of liquid crystal molecules in adjacent layers are misaligned with each other, and an overall structure of the molecules is helical.

Ambient light at a side of the mirror switching screen 2 away from the display panel 12 and display light emitted from the display panel 12 can each be decomposed into a first polarized light and a second polarized light whose polarization directions are perpendicular to each other. If a polarization direction of the first polarized light is substantially parallel to the absorption axis of the first absorptive polarizer 29, i.e., substantially perpendicular to the transmission axis of the reflective polarizer 21, a polarization direction of the second polarized light is substantially perpendicular to the absorption axis of the first absorptive polarizer 29, i.e., substantially parallel to the transmission axis of the reflective polarizer 21.

When the display apparatus 100 is in a natural state (where no electric field is generated between the first transparent electrode layer 23 and the second transparent electrode layer 27), the ambient light at the side of the mirror switching screen 2 away from the display panel 12 is directed toward the first absorptive polarizer 29; the first polarized light in the ambient light is absorbed by the first absorptive polarizer 29, and the second polarized light in the ambient light passes through the first absorptive polarizer 29 and the second alignment film 26, and then enters the liquid crystal layer 25; after the second polarized light passes through the liquid crystal layer 25, a polarization direction of the second polarized light is deflected by 90°, such that the second polarized light is converted into the first polarized light; since a polarization direction of the first polarized light is substantially perpendicular to the transmission axis of the reflective polarizer 21, the first polarized light passes through the first alignment film 24, and then is reflected back to the liquid crystal layer 25 by the reflective polarizer 21; after the first polarized light passes through the liquid crystal layer 25, the polarization direction of the first polarized light is deflected by 90°, such that the first polarized light is converted into the second polarized light; and the second polarized light passes through the second alignment film 26 and the first absorptive polarizer 29, and then is directed to outside. In this case, if each layer is of an ideal dielectric material, an attenuation of the light will tend to be zero, and the mirror switching screen 2 has a highest reflectance of greater than or equal to 40%, so that the mirror switching screen 2 is in a mirror state with the highest reflectance.

When the display apparatus 100 is in a display state (where there is a strong electric field between the first transparent electrode layer 23 and the second transparent electrode layer 27), the liquid crystal molecules are arranged in a direction of the electric field. For example, in a case where the liquid crystal molecules overcome anchoring forces from the first alignment film 24 and the second alignment film 26, and are arranged substantially vertically (long axis directions of the liquid crystal molecules are substantially parallel to a thickness direction of the mirror switching screen 2), so that the optical rotation of the liquid crystal molecules disappears. That is, the liquid crystal layer 25 does not play a role in modulating polarized light, and the polarized light passes therethrough in an original direction. In this case, the display light emitted from the display panel 12 is directed towards the reflective polarizer 21; the first polarized light in the display light is reflected by the reflective polarizer 21, and the second polarized light in the display light passes through the reflective polarizer 21 and the first alignment film 24, and then enters the liquid crystal layer 25; after the second polarized light passes through the liquid crystal layer 25, since a polarization direction of the second polarized light is unchanged, the second polarized light passes through the second alignment film 26 and the first absorptive polarizer 29, and then is directed to outside. In this case, if each layer is of an ideal dielectric material, an attenuation of the light will tend to be zero, the mirror switching screen 2 has a greatest transmittance of greater than or equal to 90%, so that the mirror switching screen 2 is in the transparent state with the highest transmittance.

As known from the above, the transmission axis of the reflective polarizer 21 is substantially perpendicular to the absorption axis of the first absorptive polarizer 29, the orientation direction of the first alignment film 24 is substantially parallel to the transmission axis of the reflective polarizer 21, and the orientation direction of the second alignment film 26 is substantially parallel to the absorption axis of the first absorptive polarizer 29. By such an design, in the natural state, the mirror switching screen 2 may exhibit the mirror state with the highest reflectance (i.e., the high reflection state), so that the display apparatus 100 may clearly show a mirror image of an ambient environment; and when images are displayed, the mirror switching screen 2 may exhibit the transparent state with the highest transmittance (i.e., the high transmission state), so that the display apparatus 100 may clearly present the display images with a low power consumption.

In addition, in order to avoid interference between light reflected by the display panel 12 and light emitted from the display panel 12, in some embodiments, as shown in FIG. 2, the display apparatus 100 further includes a second absorptive polarizer 3. The second absorptive polarizer 3 is disposed between the display panel 12 and the mirror switching panel 2. An absorption axis of the second absorptive polarizer 3 is substantially perpendicular to the transmission axis of the reflective polarizer 21. In this case, when the display apparatus 100 is in the display state, the first polarized light in the display light emitted from the display panel 12 is absorbed by the second absorptive polarizer 3, and the second polarized light sequentially passes through the second absorptive polarizer 3, the reflective polarizer 21, the first alignment film 24, the liquid crystal layer 25, the second alignment film 26 and the first absorptive polarizer 29, and then is directed to the outside. Therefore, the first polarized light in the display light emitted from the display panel 12 is prevented from being reflected to the display panel 12 by the reflective polarizer 21, and then a reflection of the first polarized light off the display panel 12 again is prevented from interfering with the display images to reduce display effects.

It will noted that in a case where the display panel 12 is a LCD panel, the upper polarizer 126 in FIG. 7 and the second absorptive polarizer 3 in FIG. 2 may be the same polarizer. In a case where the display panel 12 is an electroluminescent display panel, the second absorptive polarizer 3 may be a circular polarizer on a light-exit side of the electroluminescent display panel.

When polarizers (including the first absorptive polarizer 29, the second absorptive polarizer 3 and the reflective polarizer 21) are installed, two opposite main surfaces of the polarizer are respectively provided with an adhesive film and a protective film, and the protective film is provided thereon with an operating patch extending out of the protective film. When the polarizer is installed, an operator may pinch the operating patch to align the polarizer with a carrier, and then attach the polarizer to the carrier; and finally the operating patch and the protective film are peeled off, so that the polarizer is formed. The operation is simple, and the process difficulty is low.

Figure 8:
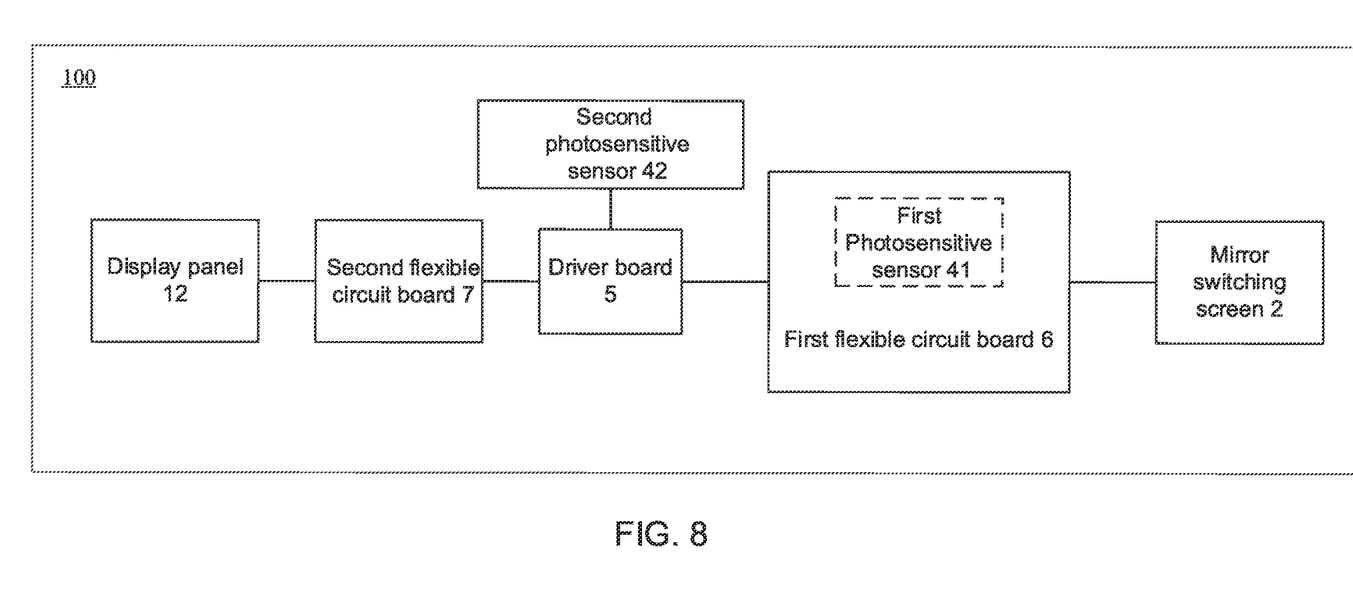
FIG. 8 is a block diagram of a display apparatus, in accordance with some embodiments.
Figure 9:
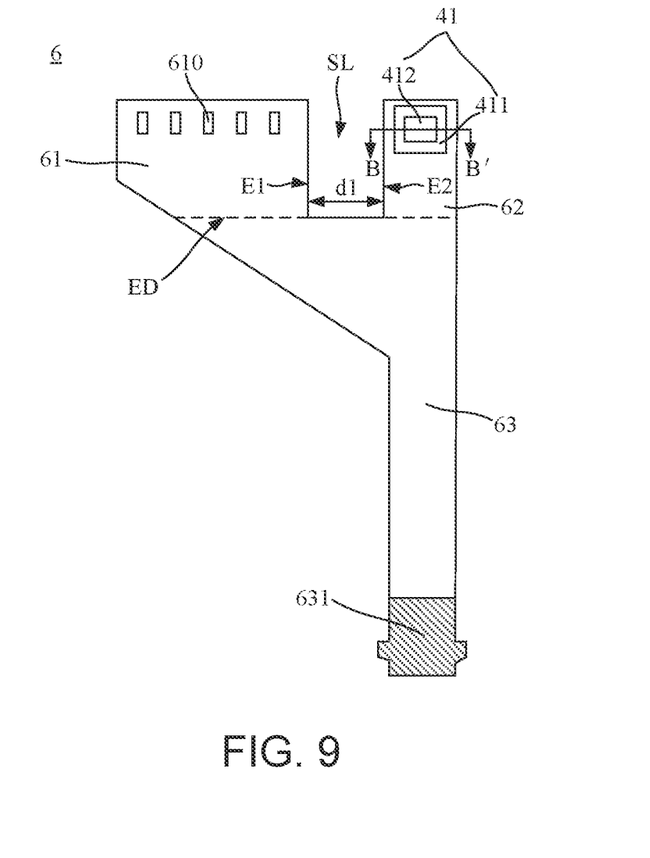
FIG. 9 is a structural diagram of a first flexible circuit board of a display apparatus, in accordance with some embodiments.

In some embodiments, as shown in FIGS. 8 and 9, the display apparatus 100 further includes a first photosensitive sensor 41 and a driver board 5.

For example, the first photosensitive sensor 41 is configured to sense a light intensity of ambient light at a side the mirror switching screen 2 away from the display panel 12 in real time. The driver board 5 is electrically connected to the first photosensitive sensor 41 and the mirror switching screen 2.

In some embodiments, the driver board 5 is configured to, in a case where the light intensity sensed by the first photosensitive sensor 41 is greater than or equal to a first preset light intensity, send a first control signal to the mirror switching screen 2, so as to reduce a reflectance of the mirror switching screen 2 and then achieve the anti-glare purpose.

It will be noted that the first preset light intensity may be determined depending on actual situations, which is not be specially limited in the embodiments of the present disclosure.

In some other embodiments, the driver board 5 may be further configured to, in a case where a difference between the light intensity of the ambient light at the side of the mirror switching screen 2 away from the display panel 12 and a light intensity of ambient light at a side of the display panel 12 away from the mirror switching screen 2 is greater than or equal to a second preset light intensity, send a corresponding control signal to the mirror switching screen 2, so as to reduce the reflectance of the mirror switching screen 2 and then achieve the anti-glare purpose.

For example, as shown in FIG. 8, the display apparatus 100 further includes a second photosensitive sensor 42. The second photosensitive sensor 42 is disposed on the side of the display panel 12 away from the mirror switching screen 2. For example, the second photosensitive sensor 42 is configured to sense the intensity of the light of the ambient light on the backlight side of the display panel 12 in real time. The driver board 5 is further electrically connected to the second photosensitive sensor 42. The driver board 5 is further configured to, in the case where the difference between the light intensity sensed by the second photosensitive sensor 42 and the light intensity sensed by the first photosensitive sensor 41 is greater than or equal to the second preset light intensity, send a third control signal to the mirror switching screen 2, so as to reduce the reflectance of the mirror switching screen 2 and then achieve the anti-glare purpose.

It will be noted that the second preset light intensity may be determined depending on actual situations, which is not be specially limited in the embodiments of the present disclosure.

In addition, the driver board 5 may further perform a plurality of determinations on the light intensity sensed by the first photosensitive sensor 41 with a plurality of preset light intensities. Each determination may be performed as follows: determining whether the light intensity sensed by the first photosensitive sensor 41 is greater than or equal to a corresponding preset light intensity; and if the light intensity sensed by the first photosensitive sensor 41 is greater than or equal to the corresponding preset light intensity, sending a corresponding control signal, so as to reduce the reflectance of the mirror switching screen 2 to a corresponding range.

In some embodiments, as shown in FIGS. 1, 2 and 9, the display apparatus 100 further includes a first flexible circuit board 6. The first flexible circuit board 6 includes a bonding portion 61, a component portion 62 and a wiring portion 63. The bonding portion 61 is electrically connected to the mirror switching screen 2. The first photosensitive sensor 41 is disposed on a surface, proximate to the mirror switching screen 2, of the component portion 62. The wiring portion 63 is provided with lines electrically connected to the first photosensitive sensor 41 and bonding pads 610 of the bonding portion 61, and the lines are configured as lines for transmitting the control signals to the mirror switching screen 2 and a sensing signal of the first photosensitive sensor 41. The driver board 5 is electrically connected to the first photosensitive sensor 41 and the mirror switching screen 2 through the wiring portion 63 of the first flexible circuit board 6. In this case, the first photosensitive sensor 41 and a circuit line connecting the first photosensitive sensor 41 to the driver board 5, and a circuit line connecting the mirror switching screen 2 to the driver board 5 are integrated in the same flexible circuit board, which may save a layout space of circuit lines and material costs.

It will be noted that an end, away from the mirror switching screen 2, of the wiring portion 63 of the first flexible circuit board 6 is provided with a first connection portion 631. The first connection portion 631 is electrically connected to a corresponding port of the driver board 5. The driver board 5 is capable of being disposed on the side of the display panel 12 away from the mirror switching screen 2 through a bending of the first flexible circuit board 6.

A relative positional relationship between the bonding portion 61, the component portion 62 and the wiring portion 63 is not unique. For example, as shown in FIGS. 1 and 9, the bonding portion 61 and the component portion 62 are both located at an end ED of the wiring portion 63 proximate to the mirror switching screen 2. In this way, it may be possible to increase arrangement regularity of circuit lines and regularity of the wiring portion 63, and reduce an area occupied by the wiring portion 63. On this basis, a gap SL exists between the bonding portion 61 and the component portion 62, so that the bonding portion 61 and the component portion 62 are separated from each other. In this way, in a process of bonding the bonding portion 61 to the mirror switching scree 2 through a crimping process, the component portion 62 is slightly affected by the crimping process; and in addition, after the bonding portion 61 is connected to the mirror switching scree 2 through bonding, an extrusion pressure between the first photosensitive sensor 41 and the mirror switching screen 2 may be decreased, which improves reliability.

For example, a minimum distance d1 between an edge E1, proximate to the component portion 62, of the bonding portion 61 and an edge E2, proximate to the bonding portion 61, of the component portion 62 is in a range of 25.55 mm to 25.95 mm, inclusive. For example, the minimum distance d1 between the edge E1, proximate to the component portion 62, of the bonding portion 61 and the edge E2, proximate to the bonding portion 61, of the component portion 62 is any one of 25.55 mm, 25.65 mm, 25.75 mm, 25.85 mm and 25.95 mm.

In some embodiments, referring to FIGS. 2 and 9, an orthographic projection of the first transparent substrate 22 on the reference surface RS is located within an orthographic projection of the second transparent substrate 28 on the reference surface RS. An edge portion, beyond the first transparent substrate 22, of the second transparent substrate 28 forms a first step 280. A side, proximate to the display panel 12, of the first step 280 is provided with bonding pins. The bonding portion 61 of the first flexible circuit board 6 is provided with the bonding pads 610. The bonding pads 610 are electrically connected to the bonding pins.

Figure 11:
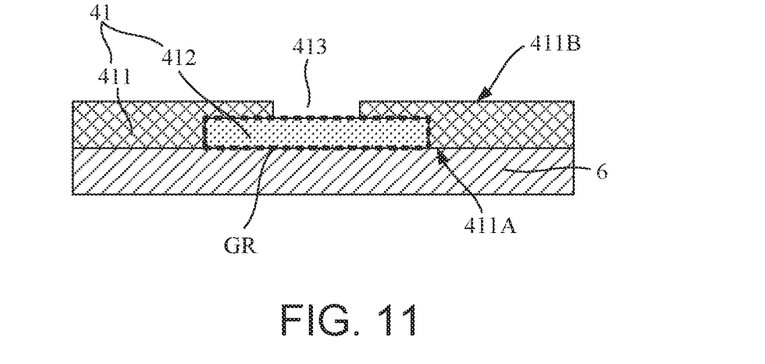
FIG. 11 is a section taken along the section line B-B' in FIG. 9.

On this basis, the first photosensitive sensor 41 is connected to the side of the first step 280 proximate to the display panel 12. For example, as shown in FIGS. 2, 9 and 11, the first photosensitive sensor 41 includes a base 411 and a photosensitive chip 412. A first surface 411A of the base 411 is provided thereon with a mounting groove GR. The photosensitive chip 412 is disposed in the mounting groove GR. A second surface 411B of the base 411 is provided therein with a light-transmitting hole 413. The photosensitive chip 412 is configured to sense the light intensity of the ambient light at the side of the mirror switching screen 2 away from the display panel 12 through the light-transmitting hole 413. The first surface 411A and the second surface 411B are two opposite surfaces of the base 411.

The first surface 411A of the base 411 is connected to the first flexible circuit board 6, and the second surface 411B of the base 411 is bonded to the side of the first step 280 proximate to the display panel 12. Here, the light-transmitting hole 413 is avoided during the bonding, so as to ensure that the photosensitive chip 412 accurately senses the light intensity of the ambient light at the side the mirror switching screen 2 away from the display panel 12.

Here, the mirror switching screen 2 includes a light-sensing region, and an orthographic projection of the first photosensitive sensor 41 on the mirror switching screen 2 at least partially overlaps with the light-sensing region.

For example, at least a portion of a region corresponding to the first step 280 of the mirror switching screen 2 acts as the light-sensing region. That is, at least a portion of the edge portion, beyond the first transparent substrate 22, of the second transparent substrate 28 is left untreated so as to ensure light transmission. The orthographic projection of the first photosensitive sensor 41 on the mirror switching screen 2 is located within the light-sensing region.

For example, the first step 280 is provided with a through hole therein. A region corresponding to the through hole is the light-sensing region. That is, a hole is defined in the edge portion, beyond the first transparent substrate 22, of the second transparent substrate 28 to form the light-transmitting hole acting as the light-sensing region. The first photosensitive sensor 41 includes the base 411 and the photosensitive chip 412. An orthographic projection of an end of the light-transmitting hole 413 in the base 411 on the mirror switching screen 2 is substantially coincident with an edge of the through hole.

On this basis, the light-sensing region may be provided with a light-guiding structure. The light-guiding structure is configured to transmit the ambient light at the side of the mirror switching screen 2 away from the display panel 12 to the photosensitive chip 412 of the first photosensitive sensor 41. For example, the light-guiding structure is disposed in the through hole, so as to transmit the ambient light at the side of the mirror switching screen 2 away from the display panel 12 to the photosensitive chip 412 of the first photosensitive sensor 41, which reduces a loss of the ambient light during transmission, and then ensures that the light sensitive chip 412 accurately senses the light intensity of the ambient light at the side of the mirror switching screen 2 away from the display panel 12.

Since the first photosensitive sensor 41 needs to receive the ambient light, the first photosensitive sensor 41 may be directly observable from a display side of the display apparatus 100. In order to improve regularity of the display apparatus 100, a center of an orthographic projection of the first photosensitive sensor 41 on the reference surface RS is substantially coincident with a center of an orthographic projection of the first step 280 on the reference surface RS. In this way, the display apparatus 100 is symmetrically distributed on left and right sides of the first photosensitive sensor 41. Therefore, an overall structure is regular and aesthetically pleasing.

In some embodiments, as shown in FIGS. 1 and 2, the orthographic projection of the display panel 12 and the orthographic projection of the mirror switching screen 2 on the reference surface RS are substantially in a shape of a trapezoid. A longer edge of two edges of the trapezoid parallel to each other is a first edge E0. On this basis, an edge portion of the second transparent substrate 28 proximate to the first edge is beyond an edge portion of the first transparent substrate 22 proximate to the first edge, so that the first step 280 is formed. By such a design, an area of the first step 280 is large, which facilitates arrangement of the first photosensitive sensor 41 and an electrical connection between the bonding portion 61 and the mirror switching screen 2.

It will be noted that, "substantially in a shape of a trapezoid" means that, an overall shape of the orthographic projection of the display panel 12 and an overall shape of the orthographic projection of the mirror switching screen 2 on the reference surface RS are each a trapezoid, but not limited to a standard trapezoid. That is, the "trapezoid" here includes, in view of process conditions, not only a substantially trapezoidal shape but also a shape similar to a trapezoid. For example, corners of the trapezoid are curved, i.e., smooth at the corners, so that the orthographic projection of the display panel 12 and the orthographic projection of the mirror switching screen 2 on the reference surface RS have a shape of a rounded trapezoid in a plan view.

For example, the display apparatus 100 is applied to a rearview mirror 10 (referring to FIG. 10) of an automobile. An outer contour of the rearview mirror 10 is substantially in a shape of a trapezoid, and a lower edge of the trapezoid is the first edge E0. Accordingly, the first step 280 is located at a lower edge of the mirror switching screen 2, and the flexible circuit board 6 is electrically connected to the mirror switching screen 2 on a lower side of the mirror switching screen 2.

In some embodiments, as shown in FIG. 2, an orthographic projection of the second absorptive polarizer 3 on the reference surface RS is located within the orthographic projection of the display panel 12 on the reference surface RS. An edge portion, beyond the second absorptive polarizer 3, of the display panel 12 forms a second step 120. The orthographic projection of the first step 280 on the reference surface RS at least partially overlaps with an orthographic projection of the second step 120 on the reference surface RS. For example, the orthographic projection of the first step 280 on the reference surface RS is substantially coincident with the orthographic projection of the second step 120 on the reference surface RS. The first flexible circuit board 6 is electrically connected to the first step 280 through bonding in a region where the first step 280 overlaps with the second step 120. In this case, the display apparatus 100 further includes a support 9. An edge of the support 9 abuts at least the first flexible circuit board 6, and the other end of the support 9 abuts the second step 120, so as to play a role in supporting the first flexible circuit board 6. For example, the end of the support 9 may abut the first flexible circuit board 6 and the first step 280, and the other end of the support 9 abuts the second step 120. In this way, the support 9 provides a large support force to the first flexible circuit board 6, and a support effect is good.

It will be noted that, in the case where the display panel 12 is the LCD panel, orthographic projections of the opposite substrate 124 and the liquid crystal cell 125 on the reference surface RS may substantially coincide with the orthographic projection of the second absorptive polarizer 3 on the reference surface RS; the orthographic projections of the opposite substrate 124 and the liquid crystal cell 125 on the reference surface RS are located within an orthographic projection of the array substrate 123 on the reference surface RS; and an edge portion, beyond the second absorptive polarizer 3, of the array substrate 123 forms the second step 120. In the case where the display panel 12 is the electroluminescent display panel, the display panel 12 is beyond the second absorptive polarizer 3, and the edge portion, beyond the second absorptive polarizer 3, of the display panel 12 forms the second step 120. FIG. 2 illustrates an example where the display panel 12 is the LCD panel (the liquid crystal cell 125 is not shown in FIG. 2).

On this basis, a material of the support 9 may be an opaque material. A light-shielding film may further be provided on a side wall of the support 9. In this way, the support 9 may further be effective to avoid light leakage while ensuring a support performance.

An elastic modulus of the support 9 is greater than or equal to 3 GPa. For example, the material of the support 9 includes at least one of foam, polyimide (PI), and a poly terephthalic acid (e.g., polyethylene terephthalate (PET)) plastic.

In addition, referring to FIG. 2, on a side of the support 9 away from the second absorptive polarizer 3, the first flexible circuit board 6 extends to the backlight side of the display panel 12, which simplifies a structure and facilitates manufacture.

In some embodiments, referring to FIG. 8, the driver board 5 is further electrically connected to the display panel 12. The driver board 5 is further configured to, in response to an operation for indicating display images from an operator, drive the display panel 12 to display images; and send a second control signal to the mirror switching screen 2 to have the mirror switching screen 2 transmit the images displayed on the display panel 12. In this case, a control circuit for driving the display panel 12 to display images and a control circuit for driving the mirror switching screen 2 to switch between states are integrated on the same driver board 5. In this way, it may be possible to further saves the layout space of circuit lines and the material costs.

On this basis, as shown in FIG. 8, the display apparatus 100 further includes a second flexible circuit board 7. The second flexible circuit board 7 is electrically connected to the display panel 12 and the driver board 5. By bending the second flexible circuit board 7 through a bending process, the driver board 5 may be located on the side of the display panel 12 away from the mirror switching screen 2, which narrows a bezel of the display panel 12.

It will be noted that, a portion of integrated circuits may also be disposed on the second flexible circuit board 7. For example, a timing control circuit is disposed on the second flexible circuit board 7. The embodiments of the present disclosure are not limited thereto. In addition, as shown in FIG. 5, an end, away from the display panel 12, of the second flexible circuit board 7 is provided with a second connecting portion 71. The second connection portion 71 is electrically connected to a corresponding port of the driver board 5.

It will be understood that, as shown in FIG. 1, the mirror switching screen 2 includes a display region B1 and a peripheral region B2 located on at least one side of the display region B1. FIG. 1 illustrates an example where the peripheral region B2 surrounds the display region B1.

Here, in conjunction with FIG. 2, the display region B1 is a light-transmitting region of the mirror switching screen 2, and the display region B1 is configured to be provided therein with the liquid crystal molecules in the liquid crystal layer 25. The peripheral region B2 may be configured to be provided therein with various signal lines required for the mirror switching screen 2, the frame sealant 251, etc.

A shape of the frame sealant 251 is irregular, which may greatly affect visual effects. In view of this, in order to improve the visual effects, as shown in FIGS. 1 and 2, the display apparatus 100 further includes a light-shielding layer 8. The light-shielding layer 8 is disposed on a side of the second transparent substrate 28 away from the display panel 12.

For example, as shown in FIG. 2, the light-shielding layer 8 is disposed between the second transparent substrate 28 and the first absorptive polarizer 29. The first absorptive polarizer 29 covers at least a portion of the light-shielding layer 8. For example, the first absorptive polarizer 29 covers the entire light-shielding layer 8. The light-shielding layer 8 covers the peripheral region B2 of the mirror switching screen 2, so that light leakage is avoided. In addition, since the light-shielding layer 8 is disposed between the second transparent substrate 28 and the first absorptive polarizer 29, flatness of a side of the first absorptive polarizer 29 away from the display panel 12 is not affected. The light-shielding layer 8 may be formed on a surface Sur2 of the second transparent substrate 28 away from the display panel 12 by a screen printing process, so that an adhesion between the light-shielding layer 8 and the second transparent substrate 28 is large, and the light-shielding layer 8 is less prone to falling off, which improves reliability.

Figure 3:
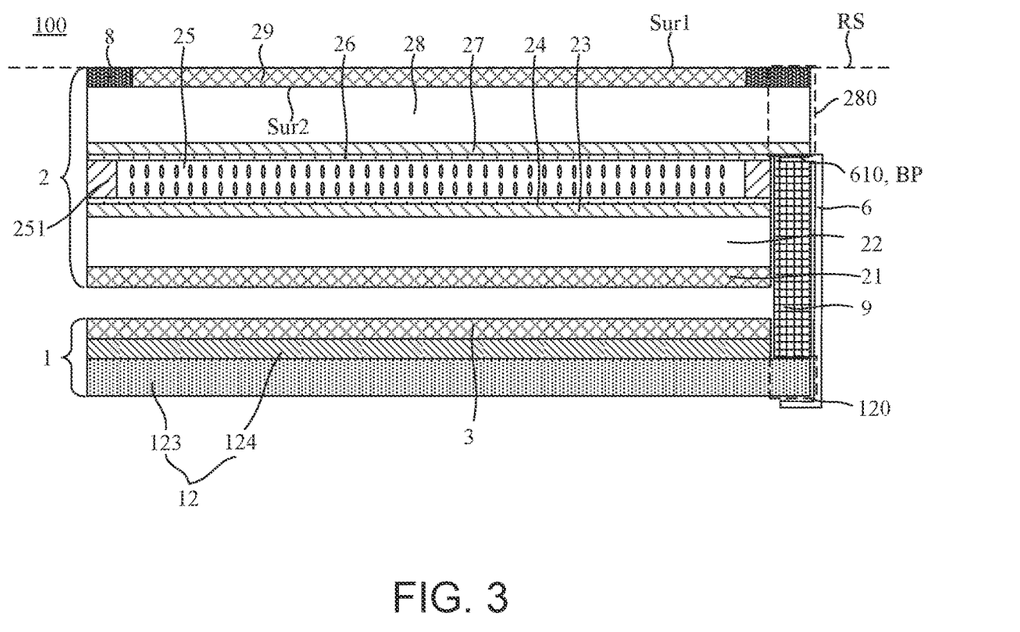
FIG. 3 is another section taken along the section line A-A' in FIG. 1.

For example, as shown in FIG. 3, both the light-shielding layer 8 and the first absorptive polarizer 29 are disposed on the surface Sur2 of the second transparent substrate 28 away from the display panel 12. An edge of an orthographic projection of the light-shielding layer 8 on the reference surface RS and an edge of an orthographic projection of the first absorptive polarizer 29 on the reference surface RS that are adjacent to each other substantially coincide with each other; alternatively, a gap exists between the edge of the orthographic projection of the light-shielding layer 8 on the reference surface RS and the edge of the orthographic projection of the first absorptive polarizer 29 on the reference surface RS that are adjacent to each other. The light-shielding layer 8 covers the peripheral region B2 of the mirror switching screen 2, so that light leakage is avoided.

Figure 4:
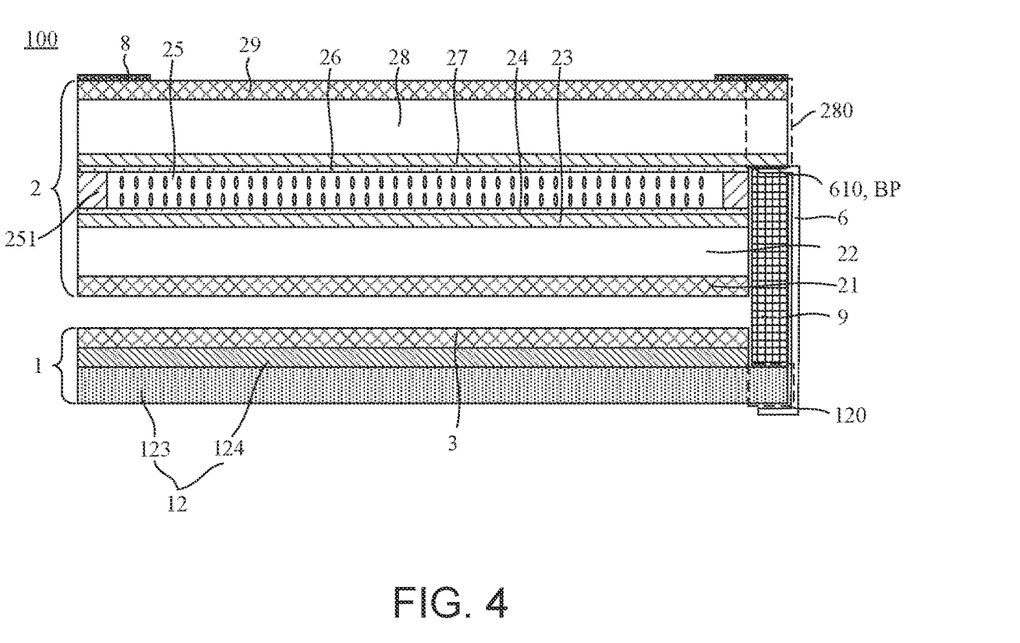
FIG. 4 is yet another section taken along the section line A-A' in FIG. 1.

For example, as shown in FIG. 4, the light-shielding layer 8 is disposed on the side of the first absorptive polarizer 29 away from the display panel 12. The light-shielding layer 8 covers the peripheral region B2 of the mirror switching screen 2, so that light leakage is avoided.

Here, the light-shielding layer 8 may be formed on the surface Sur2 of the second transparent substrate 28 away from the display panel 12 by a screen printing process or a sputtering process, so as to achieve a narrow bezel design of the display apparatus 100. A material of the light-shielding layer 8 includes ink and/or metal. For example, the material of the light-shielding layer 8 is a mirror-like silver ink or a metallic colored ink. By such a design, when the mirror switching screen 2 is in the high reflection state, the light-shielding layer 8 may be substantially consistent with the display region B1 of the mirror switching screen 2 due to the use of the mirror-like silver ink or the metallic colored ink. Therefore, mirror display effects are good.

For example, the material of the light-shielding layer 8 is a volatile drying ink. In detail, a polymer substance is dissolved in a solvent, and then the solvent having the polymer substance is printed onto the surface Sur2 of the second transparent substrate 28 away from the display panel 12 to form an ink film; and the solvent in the ink film diffuses into atmosphere due to vapor pressure to form a liquid film on a surface of the ink film, and then volatilizes on a basis of the liquid film. During drying, drying may be accelerated by blowing air. Here, the material of the light-shielding layer 8 adopts the volatile drying ink, so that process is simple, and a production speed is fast.

For example, the material of the light-shielding layer 8 is an ultraviolet curing type ink. In detail, the ultraviolet curing type ink is printed onto the surface Sur2 of the second transparent substrate 28 away from the display panel 12; and after ultraviolet irradiation, the ultraviolet ink undergoes a photochemical reaction, and then may be fully cured within a few seconds. Here, a material of the ultraviolet curing type ink may include a photopolymeric resin, an initiator, a colorant and an auxiliary.

For another example, the material of the light-shielding layer 8 is an oxidative drying ink. In detail, the oxidative drying ink is printed onto the surface Sur2 of the second transparent substrate 28 away from the display panel 12; and since including polymers with smaller molecular weights, the oxidative drying ink is oxidized in air and cured by heat or light or chemical reaction of reactive matters to form a polymer film (the light-shielding layer 8).

In some embodiments, a thickness of the light-shielding layer 8 is in a range of 6.5 μm to 7.5 μm, inclusive. In this way, under a premise of ensuring light-shielding, it may be possible to reduce an impact on a total thickness of the display apparatus 100 due to the addition of the light-shielding layer 8. For example, the thickness of the light-shielding layer 8 is any one of 6.5 μm, 7 μm and 7.5 μm.

In some embodiments, referring to FIG. 1, a minimum width S2 of the light-shielding layer 8 is in a range of 4.3 mm to 4.7 mm, inclusive; and a maximum width S1 of the light-shielding layer 8 is in a range of 8.89 mm to 9.29 mm, inclusive. For example, the minimum width S2 of the light-shielding layer 8 is any one of 4.3 mm, 4.4 mm, 4.5 mm, 4.6 mm and 4.7 mm; and the maximum width S1 of the light-shielding layer 8 is any one of 8.89 mm, 8.99 mm, 9.09 mm, 9.19 mm and 9.29 mm.

It will be noted that, when a width direction is defined, the width direction may vary depending on position of the light-shielding layer 8. For example, an orthographic projection of the light-shielding layer 8 on the reference surface RS is strip-shaped, and the width direction refers to a direction parallel to the reference surface RS and perpendicular to an extension direction of the light-shielding layer 8. For example, the light-shielding layer 8 may be formed by connecting a plurality of strip-shaped sub-light-shielding patterns, and be in a shape of a closed ring as shown in FIG. 1. Each sub-light-shielding pattern extends in a direction and is disposed to a corresponding edge of the mirror switching screen 2. In this case, for different sub-light-shielding patterns, extension directions are different, and width directions may be accordingly different.

For example, the display apparatus 100 is applied to a rearview mirror 10 of an automobile (referring to FIG. 10), and the first step 280 corresponds to a lower edge of the display apparatus 100. A width of a portion of the light-shielding layer 8 corresponding to the lower edge of the display apparatus 100 is in a range of 8.89 mm to 9.29 mm, inclusive; and widths of portions of the light-shielding layer 8 of corresponding to remaining edges of the display apparatus 100 are in a range of 4.3 mm to 4.7 mm, inclusive.

It will be understood that, as shown in FIGS. 1 and 9, the light-shielding layer 8 is provided with an avoidance hole 81. An orthographic projection of the photosensitive sensor 41 on the reference surface RS at least partially overlaps with an orthogonal projection of the avoidance hole 81 on the reference surface RS, so that it is ensured that the photosensitive sensor 41 may receive the ambient light from the outside. For example, the orthographic projection of the photosensitive sensor 41 on the reference surface RS is located within the orthogonal projection of the light-shielding layer 8 on the reference surface RS, so that an influence of the light-shielding layer 8 on the light intensity, sensed by the first photosensitive sensor 41, of the ambient light at the side of the mirror switching screen 2 away from the display panel 12 is avoided. A diameter of the avoidance hole 81 is in a range of 2.5 mm to 2.9 mm, inclusive. For example, the diameter of the avoidance hole 81 is any one of 2.5 mm, 2.6 mm, 2.7 mm, 2.8 mm and 2.9 mm.

In some embodiments, referring to FIG. 1, in a first direction X, a maximum dimension L of the display apparatus 100 is in a range of 239.64 mm to 240.04 mm, inclusive. The first direction X is substantially parallel to a side edge of the display apparatus 100. For example, in the first direction X, the maximum dimension L of the display apparatus 100 is any one of 239.64 mm, 239.74 mm, 239.84 mm, 239.94 mm and 240.04 mm.

In some embodiments, referring to FIG. 1, in a second direction Y, a maximum dimension W of the display apparatus 100 is in a range of 61.2 mm to 61.6 mm, inclusive. The second direction Y is substantially perpendicular to the first direction X. For example, in the second direction Y, the maximum dimension W of the display apparatus 100 is any one of 61.2 mm, 61.3 mm, 61.4 mm, 61.5 mm and 61.6 mm.

Figure 10:
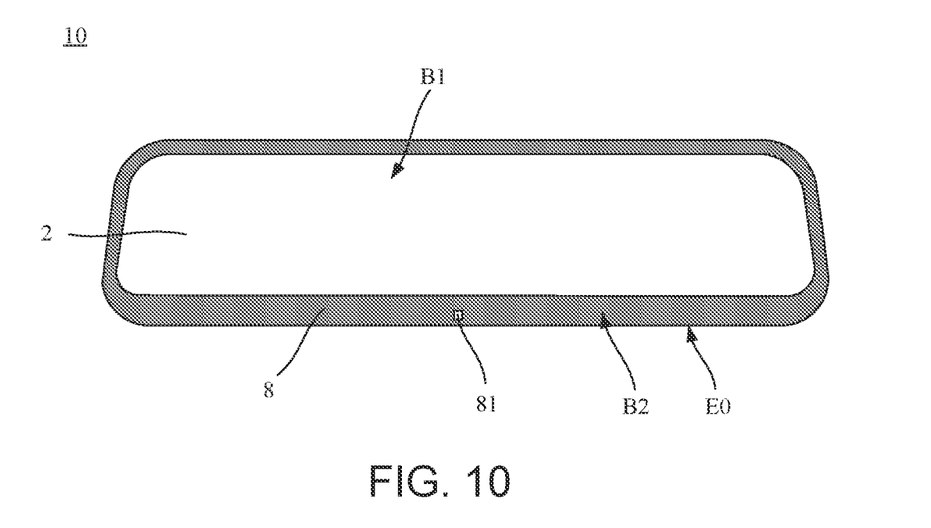
FIG. 10 is a structural diagram of a rearview mirror, in accordance with some embodiments.

For example, referring to FIGS. 1 and 10, the display apparatus 100 is applied to a rearview mirror 10 of an automobile. An outer contour of the rearview mirror 10 is substantially trapezoidal. A size of a lower edge of the display apparatus 100 is greater than a size of an upper edge thereof. The first direction X is substantially parallel to the lower edge of the display apparatus 100. In this case, in the first direction X, the dimension L of the display apparatus 100 is 239.84 mm; and in the second direction Y, the dimension W of the display apparatus 100 is 61.4 mm.

It will be noted that the "substantially trapezoidal" means that an overall shape of the outer counter of the rearview mirror 10 is a trapezoid, but not limited to a standard trapezoid. That is, the "trapezoid" here includes, in view of process conditions, not only a substantially trapezoidal shape but also a shape similar to a trapezoid. For example, corners of the trapezoid are curved, i.e., smooth at the corners, so that the shape of the outer counter of the rearview mirror 10 is a rounded trapezoid in a plan view.

Some embodiments of the present disclosure provide another display apparatus. The display apparatus includes a mirror switching display panel, a first photosensitive sensor, a first circuit board and a driver board.

Here, the mirror switching display panel is capable of switching between a high transmission state and a high reflection state on a light-exit side thereof. When the mirror switching display panel is in the high transmission state on the light-exit side thereof, display images may be transmitted out of the mirror switching display panel to achieve a display function; and when the mirror switching display panel is in the high reflection state on the light-exit side thereof, ambient light is reflected by the mirror switching display panel to render mirror images.

It will be noted that, the mirror switching display panel of the display apparatus provided in embodiments of the present disclosure may include the display panel 12 and the mirror switching screen 2 of the display apparatus 100 described in the above embodiments. For specific features and structures, reference may be made to the description above, and the embodiments of the present disclosure will not repeat here.

The first circuit board includes a bonding portion, a component portion and a wiring portion. The first photosensitive sensor is disposed on the component portion. The wiring portion is provided with lines electrically connected to the first photosensitive sensor and bonding pads of the bonding portion. The driver board is electrically connected to the mirror switching display panel through lines of the first circuit board.

It will be noted that, the first circuit board of the display apparatus provided in embodiments of the present disclosure may include the first flexible circuit board 6 of the display apparatus 100 in the above embodiments. For specific features and structures, reference may be made to the description above, and the embodiments of the present disclosure will not repeat here. In addition, the driver board of the display apparatus provided in embodiments of the present disclosure may include the driver board 5 of the display apparatus 100 in the above embodiments. For specific features and structures, reference may be made to the description above, and the embodiments of the present disclosure will not repeat here.

The display apparatus provided in embodiments of the present disclosure may be combined with other features and structures included in the display apparatus 100 described in the above embodiments in a suitable manner, and the embodiments of the present disclosure will not repeat here.

As shown in FIG. 10, some embodiments of the present disclosure provide a rearview mirror 10. The rearview mirror 10 includes the display apparatus 100 described in any one of the above embodiments.

The foregoing descriptions are merely specific implementations of the present disclosure. However, the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A display apparatus, comprising:
   a display panel;
   a mirror switching screen, disposed on a light-exit side of the display panel;
   a first photosensitive sensor, configured to sense a light intensity of ambient light at a side of the mirror switching screen away from the display panel;
   a first flexible circuit board, including a bonding portion, a component portion and a wiring portion, the bonding portion being electrically connected to the mirror switching screen, the first photosensitive sensor being disposed on a side of the component portion proximate to the mirror switching screen, and the wiring portion having lines electrically connected to the first photosensitive sensor and bonding pads of the bonding portion; and
   a driver board, electrically connected to the wiring portion of the first flexible circuit board.

2. The display apparatus according to claim 1, wherein the bonding portion and the component portion are both located at an end of the wiring portion proximate to the mirror switching screen, and the bonding portion and the component portion have a gap therebetween.

3. The display apparatus according to claim 2, wherein a minimum distance between an edge of the bonding portion proximate to the component portion and an edge of the component portion proximate to the bonding portion is in a range of 25.55 mm to 25.95 mm, inclusive.

4. The display apparatus according to claim 1, wherein the driver board is further electrically connected to the display panel.

5. The display apparatus according to claim 4, further comprising:
   a second flexible circuit board, electrically connected to the display panel and the driver board, wherein the driver board is capable of being disposed on a side of the display panel away from the mirror switching screen through bending of the first flexible circuit board and the second flexible circuit board.

6. The display apparatus according to claim 1, wherein in a direction from the display panel to the mirror switching screen, the mirror switching screen includes a reflective polarizer, a first transparent substrate, a first transparent electrode layer, a first alignment film, a liquid crystal layer, a second alignment film, a second transparent electrode layer, a second transparent substrate and a first absorptive polarizer that are disposed in sequence,
   wherein a transmission axis of the reflective polarizer is substantially perpendicular to an absorption axis of the first absorptive polarizer, an orientation direction of the first alignment film is substantially parallel to the transmission axis of the reflective polarizer, and an orientation direction of the second alignment film is substantially parallel to the absorption axis of the first absorptive polarizer.

7. The display apparatus according to claim 6, wherein an orthographic projection of the first transparent substrate on a reference surface is located within an orthographic projection of the second transparent substrate on the reference surface; and the reference surface is a plane where a surface of the mirror switching screen away from the display panel is located; and an edge portion, beyond the first transparent substrate, of the second transparent substrate forms a first step, a side of the first step proximate to the display panel has bonding pins, and the bonding pads are further electrically connected to the bonding pins.

8. The display apparatus according to claim 7, wherein the first photosensitive sensor includes a base and a photosensitive chip, a first surface of the base has a mounting groove, the photosensitive chip is disposed in the mounting groove, a second surface of the base has a light-transmitting hole, the photosensitive chip is configured to sense the light intensity of the ambient light at the side of the mirror switching screen away from the display panel through the light-transmitting hole, and the first surface and the second surface are two opposite surfaces of the base, wherein the first surface of the base is connected to the first flexible circuit board, and the second surface of the base is bonded to the side of the first step proximate to the display panel.

9. The display apparatus according to claim 7, wherein a center of an orthographic projection of the first photosensitive sensor on the reference surface is substantially coincident with a center of an orthographic projection of the first step on the reference surface.

10. The display apparatus according to claim 6, wherein the mirror switching screen has a display region and a peripheral region located on at least one side of the display region; and the display apparatus further comprises:

a light-shielding layer, disposed on a side of the second transparent substrate away from the display panel and covering the peripheral region.

11. The display apparatus according to claim 10, wherein the light-shielding layer is disposed between the second transparent substrate and the first absorptive polarizer; and the first absorptive polarizer covers at least a portion of the light-shielding layer.

12. The display apparatus according to claim 10, wherein the light-shielding layer and the first absorptive polarizer are both disposed on a surface of the second transparent substrate away from the display panel, and an edge of an orthographic projection of the light-shielding layer on a reference surface and an edge of an orthographic projection of the first absorptive polarizer on the reference surface that are adjacent to each other are substantially coincident with each other, or have a gap therebetween, wherein the reference surface is a plane where a surface of the mirror switching screen away from the display panel is located.

13. The display apparatus according to claim 10, wherein the light-shielding layer has an avoidance hole, an orthographic projection of the first photosensitive sensor on a reference surface at least partially overlaps with an orthogonal projection of the avoidance hole on the reference surface, wherein the reference surface is a plane where a surface of the mirror switching screen away from the display panel is located.

14. The display apparatus according to claim 10, wherein a material of the light-shielding layer includes ink and/or metal.

15. The display apparatus according to claim 10, wherein a thickness of the light-shielding layer is in a range of 6.5 µm to 7.5 µm, inclusive.

16. The display apparatus according to claim 6, further comprising:

a second absorptive polarizer, disposed between the display panel and the mirror switching screen, and an absorption axis of the second absorptive polarizer being substantially perpendicular to the transmission axis of the reflective polarizer.

17. The display apparatus according to claim 16, wherein an edge portion, beyond the first transparent substrate, of the second transparent substrate forms a first step; and an orthographic projection of the second absorptive polarizer on a reference surface is located within an orthographic projection of the display panel on the reference surface, and the reference surface is a plane where a surface of the mirror switching screen away from the display panel is located; an edge portion, beyond the second absorptive polarizer, of the display panel forms a second step; and an orthographic projection of the first step on the reference surface at least partially overlaps with an orthographic projection of the second step on the reference surface; and the display apparatus further comprises:

a support, an end of the support abutting at least the first flexible circuit board, and another end of the support abutting the second step.

18. The display apparatus according to claim 17, wherein at a side of the support away from the second absorptive polarizer, the first flexible circuit board extends to a backlight side of the display panel.

19. The display apparatus according to claim 1, further comprising:

a second photosensitive sensor, disposed on a side of the display panel away from the mirror switching screen and configured to sense a light intensity of ambient light on a backlight side of the display panel, wherein the driver board is further electrically connected to the second photosensitive sensor.

20. A rearview mirror, comprising the display apparatus according to claim 1.

* * * * *